United States Patent

[11] 3,579,019

[72] Inventor Alfred D. Scarbrough
 Northridge, Calif.
[21] Appl. No. 812,256
[22] Filed Apr. 1, 1969
[45] Patented May 18, 1971
[73] Assignee The Bunker-Ramo Corporation
 Oak Brook, Ill.

[54] LIGHT CELL MATRIX STRUCTURE
 13 Claims, 4 Drawing Figs.
[52] U.S. Cl. ............................................. 313/109.5,
 313/113, 315/169R, 340/381
[51] Int. Cl. ............................................. H01j 5/16
[50] Field of Search ............................................. 313/109.5,
 113, 108 (A) (Cursory); 315/169, 169 (TV);
 340/380, 381

[56] References Cited
 UNITED STATES PATENTS

| | | | |
|---|---|---|---|
| 2,975,318 | 3/1961 | Nicoll .......................... | (315/169TV) |
| 3,220,000 | 11/1965 | Lesage ......................... | 315/169X |
| 3,254,266 | 5/1966 | Fleming-Williams ......... | 313/108X |
| 3,371,243 | 2/1968 | Bramley et al. ............... | 315/169 |
| 3,501,676 | 3/1970 | Adler et al. .................... | 315/169 |

Primary Examiner—Roy Lake
Assistant Examiner—Palmer C. Demeo
Attorney—Frederick M. Arbuckle ABSTRACT: A light cell structure for supporting and conducting energizing signals to a rectangular matrix of ionizable gas-filled light cells. The structure is constructed and arranged so as to permit the emitted light from an energized cell to be directly viewed without first passing through an electrode. Each light cell is typically of the general shape of a rectangular parallelopiped. One pair of opposed surfaces of each parallelopiped light cell serve as energizing surfaces, and one of the remaining surfaces is a light transmitting surface which serves as a viewing surface. The light cells are supported and selectively energized by a row-column arrangement of conductive members to which the light cells are affixed by their energizing surfaces. The row conductive members are typically conductive strips, while the column conductive members are typically conductive strips having uniformly spaced upstanding tabs provided along the length thereof. Each light cell has one of its energizing surfaces affixed to a respective row strip at a respective one of a plurality of uniformly spaced positions along the length of the row, and the other of its energizing surfaces affixed to a respective one of the upstanding tabs of a respective column strip. Provision is also made for enhancing light emitted from the viewing surface of each parallelopiped light cell by using the remaining surface thereof as a second light transmitting surface whose emitted light passes through a respective appropriately located aperture provided in the column strip to reflective means which reflects light emitted from this second light transmitting surface back up through the light cell and out the viewing surface.

Patented May 18, 1971 3,579,019
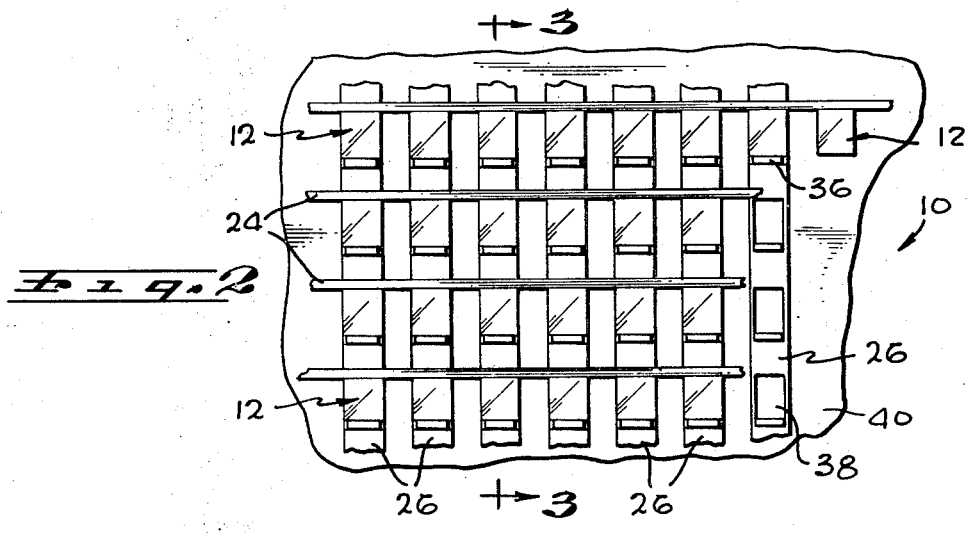
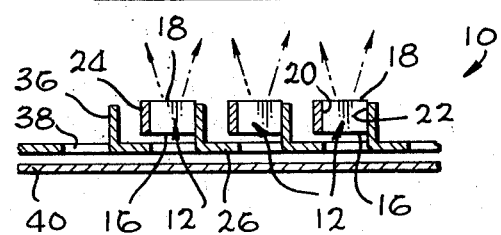
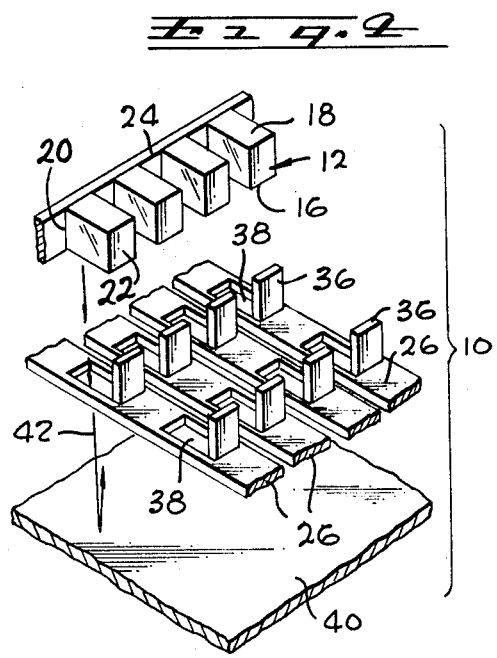
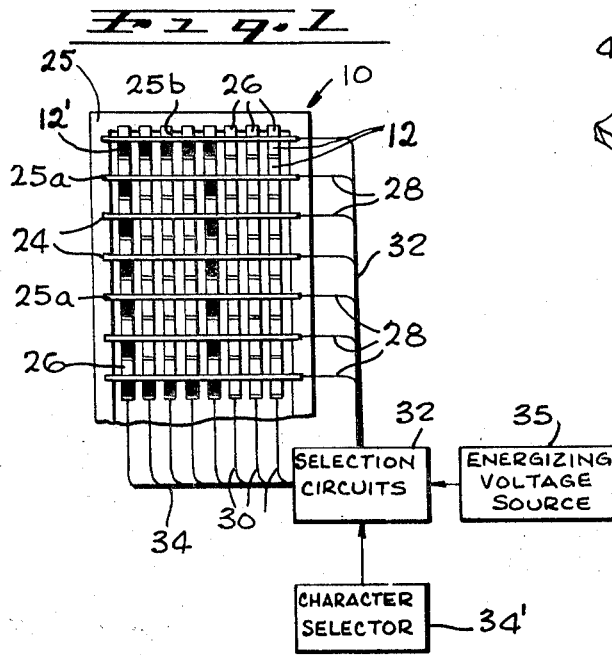
ALFRED D. SCARBROUGH
INVENTOR.
BY Nathan Cass
ATTORNEY

LIGHT CELL MATRIX STRUCTURE

BACKGROUND OF THE INVENTION

This invention relates generally to a light cell display, and more particularly to means for supporting the light cells and for conducting energizing signals to selected ones thereof to provide a desired display.

Display devices having a viewing screen with selectively illuminable light cells to convey information are being increasingly utilized in industrial, commercial, and military applications. Such devices can be used, for example, in computer readout displays, stock exchange quotation displays, teaching machines, or computer-controlled information displays.

One device currently in use is a substantially flat plate containing a matrix of discrete light cells. A typical light cell is a substantially rectangular glass parallelopiped having a pair of opposed transparent surfaces and containing a mixture of nitrogen and neon at a combined pressure near atmospheric. Metallic energizing electrodes are provided on the transparent surfaces for energizing and deenergizing purposes. It will be understood that such a construction requires at least one of the metallic energizing electrodes to be transparent so that the light emitted from an energized cell may be seen.

While it is desirable to make the transparent energizing electrode very thin so as to permit the maximum passage of light, the impedance drop in the electrode due to the higher resistance may become limiting, particularly if precise voltage control is required for proper switching performance of the cells. Thus, this type of known construction does not permit obtaining full use of the light emitting capability of the light cells.

SUMMARY OF THE INVENTION

This invention contemplates the use of a light cell matrix construction which permits the emitted light from a light cell to be directly viewed without having to pass through an energizing electrode, whereby all of the available emitted light may be transmitted to the observer. The invention also contemplates further enhancement of the emitted light by providing for the utilization of the light emitted from a plurality of light emitting surfaces provided for each light cell.

It is therefore a broad object of this invention to provide a new and improved light cell matrix construction which permits full use of the light emitting capability of the light cells.

A more specific object of this invention is to provide a new and improved light cell matrix construction which permits direct viewing of the light emitted from a light cell without requiring that the emitted light pass through one of the energizing electrodes.

Another object of this invention is to provide a new and improved light cell matrix construction having means for enhancing the emitted light by utilizing the light emitted from a plurality of light emitting surfaces provided on each light cell.

Further objects and advantages of this invention will be apparent from the following description of a preferred embodiment taken in conjunction with the accompanying drawing in which:

FIG. 1 is a plan view of an exemplary light cell matrix structure in accordance with the invention along with conventional selective energization means which may be used therewith;

FIG. 2 is an enlarged plan view of a portion of the light cell matrix structure of FIG. 1;

FIG. 3 is a sectional view taken along the line 3—3 in FIG. 2; and

FIG. 4 is an exploded perspective view of the light cell matrix structure of FIGS. 1 to 3.

DESCRIPTION OF THE PREFERRED EMBODIMENT

Referring to the drawing, particularly FIGS. 1 and 2, a light cell structure 10 is illustrated having a plurality of light cells 12 arranged in a rectangular matrix, such as might be used for displaying characters. For example, FIG. 1 illustrates a display of the numeral 0, a blackened cell such as illustrated at 12' being used to indicate that the cell is illuminated. The light cells 12 may, for example, be electroluminescent cells, plasma cells, or other known types. As shown in FIGS. 3 and 4, each light cell 12 has generally opposed light transmitting surfaces 16 and 18, with the surface 18 being the viewing surface. Each light cell includes at least one pair of generally opposed energizing surfaces 20 and 22 (FIG. 3), disposed substantially transverse to the light transmitting surfaces 16 and 18, for receiving energizing signals for controlling the energization and deenergization of the cell. The energizing surfaces 20 and 22 need not actually have individual electrodes physically attached thereto in order to receive the energizing signals, and such are not shown in the drawing. However, individual electrodes could be attached if desired in any well-known manner. Each light cell 12 may typically be a glass-walled rectangular parallelopiped containing an ionizable gas mixture adapted to be energized in response to appropriate energizing signals applied to its energizing surfaces 20 and 22.

A preferred structure for supporting the cells 12 and selectively conducting energizing signals thereto will now be considered. As best illustrated in FIGS. 3 and 4, a plurality of uniformly spaced, parallel rows of rigid conductive strips 24 are provided with each strip 24 having a single row of uniformly spaced cells 12 affixed thereto by their surfaces 20 using, for example, a conductive epoxy. Also provided are a plurality of uniformly spaced, parallel columns of rigid conductive strips 26 perpendicular to the strips 24 and positioned under the cell matrix (as viewed in FIGS. 3 and 4). As best illustrated in FIG. 4, each of the column strips 26 has uniformly spaced, upstanding tabs 36 provided thereon to which the other energizing surfaces 22 of respective cells 12 are affixed, such as by a conductive epoxy. The upstanding tabs 36 are formed in a manner, such as by stamping, so as to leave apertures or windows 38 in the column strips 26 alternating with the tabs 36 and adjacent respective light transmitting surfaces 16 of the light cells 12. A mirror 40 is placed on the side of the apertures 38 opposite to the light cells 12 to reflect intercepted light emitted by the light transmitting surfaces 16 back up and through their respective light cells so as to thereby enhance the light emitted from the light transmitting viewing surfaces 18.

As illustrated in FIG. 1, the conductive strips 24 and 26 are supported at their ends by a frame 25 of nonconductive material to which the strips are secured by any suitable means. For this purpose, respective slots 25a and 25b may be provided in the frame 25 for receiving and retaining the strips 24 and 26 with the aid of a suitable epoxy. The mirror 40 may also be supported by the frame 25 in any suitable manner. Although the conductive strips 24 and 26 are shown electrically insulated from each other by the air spacing provided therebetween, it will be understood that insulating material could appropriately be provided for this purpose if desired.

As also illustrated in FIG. 1, the strips 24 and 26 are electrically connected via conductors 28 and 30 and cables 32 and 34 to selection circuits 32. A character selector 34' controls the selection circuits 32 to selectively distribute appropriate magnitude energizing voltages from an energizing voltage source 35 to selected ones of the strips 24 and 26, a light cell 12 becoming energized only when both its respective row and column strips 24 and 26 have energizing voltages applied thereto. Thus, by appropriate selection of the strips 24 and 26 which are to receive energizing voltages, a predetermined pattern of illuminated cells may be provided to produce a desired display, as illustrated by the illuminated cells 12' in FIG. 1 which display the number 0. It will be understood that the selective energizer 32, the character selector 34', the energizing voltage source 35, and the described cooperation therebetween may be conventional.

While there has been shown and described a preferred embodiment of the invention, it is to be understood that various other adaptations and modifications of the invention may be made without departing from the spirit and scope of the invention.

For example, although the drawing illustrates a rectangular coordinate array, it will be understood that the invention may be employed for other configurations, particularly where the two coordinates also cross substantially orthogonally, such as in a circular coordinate system having one set of energizing conductors fanning out radially and the other set being circular. The walls of the cells 12 could be modified to conform to the new configuration, or the energizing conductors could have flat spots thereon adapted to conform to the straight sides of the cells 12. Even a hyperbolic-elliptical coordinate system might be used.

The above examples of possible modifications are only illustrative, and many others are also possible. Accordingly, the invention is properly to be considered as including all possible modifications and variations coming within the scope of the invention as defined by the appended claims.

I claim:

1. A light cell energizing and supporting structure comprising:
   a two-coordinate matrix arrangement of a plurality of energizable light cells, each light cell comprising an enclosure containing electrically energizable light producing means within the enclosure, each enclosure including at least one light transmitting surface and a pair of energizing surfaces different from said light transmitting surface,
   a first plurality of conductive members arranged corresponding to one of the coordinates of the two-coordinate light cell arrangement and electrically coupled to one of the energizing surfaces of respective light cells in conformance with the coordinate arrangement thereof, and
   a second plurality of conductive members arranged corresponding to the other coordinate of the two-coordinate arrangement and electrically coupled to the other of the energizing surfaces of respective light cells in conformance with the coordinate relationship thereof,
   said conductive members being electrically coupled to their respective energizing surfaces so that any selected one of said light cells may be energized by application of electrical signals to the conductive members whose coordinates correspond to the coordinate location of the selected light cell.

2. The invention in accordance with claim 1, wherein said conductive members and said light cells and the electrical coupling therebetween are constructed and arranged so that there is no interference with light emitted from the light transmitting surfaces of said light cells.

3. The invention in accordance with claim 1, wherein the enclosure of each of said light cells includes a second light transmitting surface, and wherein said structure includes means for reflecting light emitted from each second light transmitting surface back through the cell and out of the first light transmitting surface thereof so as to enhance the light emitted from each cell.

4. The invention in accordance with claim 1, wherein the energizing surfaces are directly affixed to respective ones of said conductive members so that said conductive members serve to provide support for said light cells as well as being electrically coupled to the energizing surfaces thereof.

5. The invention in accordance with claim 1, wherein said first plurality of conductive members comprises a first plurality of spaced elongated conductors each having the energizing surfaces of respective light cells affixed along the length thereof, and wherein said second plurality of conductive members comprises a second plurality of spaced elongated conductors each having upstanding conductive tabs depending therefrom and spaced along the length thereof and to which tabs the other of the energizing surfaces of respective light cells are affixed.

6. The invention in accordance with claim 5, wherein said two-coordinate arrangement is a rectangular coordinate system, and wherein said conductors and said light cells are constructed and arranged so that there is no interference with light emitted from the light transmitting surfaces of said light cells.

7. The invention in accordance with claim 5, wherein each light cell enclosure is in the shape of a parallelopiped, a first pair of opposed surfaces thereof serving as said energizing surfaces and one of the remaining surfaces thereof serving as said light transmitting surface.

8. The invention in accordance with claim 5, wherein the enclosure of each of said light cells includes a second light transmitting surface, wherein each of said plurality of second conductors has spaced apertures therein located along the length thereof so as to alternate with said tabs, said apertures and the second light transmitting surfaces being located so that each second light transmitting surface of a light cell has an aperture adjacent thereto, and wherein said structure includes reflecting means for intercepting light passing through said apertures and for reflecting light emitted from each second light transmitting surface of a light cell back through the cell and out of the first light transmitting surface thereof so as to enhance the light emitted from each cell.

9. The invention in accordance with claim 8, wherein said second light transmitting surface is different from said energizing surfaces.

10. A light cell structure comprising:
    a plurality of energizable light cells in a predetermined arrangement, each light cell comprising an enclosure containing electrically energizable light producing means within the enclosure, each enclosure having first and second light transmitting surfaces,
    first means for supporting said cells in said predetermined arrangement and for applying energizing signals thereto in a manner so as to permit energization of selected ones thereof, and
    second means cooperating with said first means for reflecting light emitted from one of the light transmitting surfaces of an energized cell back through the cell and out of the other light transmitting surface of the cell so as to enhance the light emitted from each cell.

11. The invention in accordance with claim 10, wherein each light cell enclosure also includes a pair of energizing surfaces different from said light transmitting surfaces, and wherein said first means is mechanically and electrically coupled to said energizing surfaces.

12. A light cell structure comprising:
    a row-column arrangement of a plurality of individually energizable light cells, each light cell comprising an enclosure having a parallelopiped shape and containing electrically energizable light producing means, one pair of opposed surfaces of the enclosure being adapted to serve as energizing surfaces and one of the remaining surfaces thereof being adapted to serve as a light transmitting surface,
    a first plurality of spaced, elongated and parallel conductive members arranged in rows, each conductive member of said first plurality having a corresponding row of spaced light cells affixed along the length thereof by attachment to one of the energization surfaces thereof in a manner so as to provide electrical and mechanical coupling therebetween, and
    a second plurality of spaced, elongated and parallel conductive members arranged in columns and electrically insulated from said first plurality of conductive members, each conductive member of said second plurality having upstanding conductive tabs spaced along the length thereof to which a corresponding column of light cells are affixed by attachment to the other of the energization surfaces thereof in a manner so as to provide electrical and mechanical coupling therebetween.

13. The invention in accordance with claim 12,
wherein the other of the remaining surfaces of each light cell serves as a second light transmitting surface,
wherein each of said second plurality of conductive members has spaced apertures therein located along the length thereof with the second light transmitting surface of each cell adjacent a respective aperture, and
wherein said structure includes reflecting means for reflecting light emitted from each second light transmitting surface of a light cell back through the cell and out of the first-mentioned light transmitting surface thereof.